US008078303B2

(12) United States Patent
McGuinn et al.

(10) Patent No.: US 8,078,303 B2
(45) Date of Patent: Dec. 13, 2011

(54) ELECTRONIC SUPERVISOR

(75) Inventors: Jackie McGuinn, Villa Rica, GA (US); Tom Stephens, Carrollton, GA (US); Steve Wilson, Carrollton, GA (US); Stephen Logan, Douglasville, GA (US); Mike Crumpler, Carrollton, GA (US); Alon Stewart, Smyrna, GA (US); Hugh Butler, Carrollton, GA (US)

(73) Assignee: Southwire Company, Carrollton, GA (US)

( * ) Notice: Subject to any disclaimer, the term of this patent is extended or adjusted under 35 U.S.C. 154(b) by 653 days.

(21) Appl. No.: 12/166,521

(22) Filed: Jul. 2, 2008

(65) Prior Publication Data
US 2009/0164850 A1 Jun. 25, 2009

Related U.S. Application Data

(60) Provisional application No. 60/947,893, filed on Jul. 3, 2007.

(51) Int. Cl.
| | |
|---|---|
| G06Q 10/00 | (2006.01) |
| G06F 7/00 | (2006.01) |
| G06F 7/66 | (2006.01) |
| G01V 3/08 | (2006.01) |
| G01R 31/00 | (2006.01) |
| H01H 31/02 | (2006.01) |
| G05B 11/01 | (2006.01) |
| H01R 9/05 | (2006.01) |

(52) U.S. Cl. .......... 700/109; 705/28; 707/634; 707/687; 324/326; 324/508; 324/555; 100/95; 100/117; 439/578

(58) Field of Classification Search .................... 705/28; 707/634, 687; 700/22, 109, 110, 95, 117; 324/326, 508, 555; 439/578
See application file for complete search history.

(56) References Cited

U.S. PATENT DOCUMENTS

| | | | | | |
|---|---|---|---|---|---|
| 3,612,744 | A | * | 10/1971 | Thomas | 174/36 |
| 3,616,066 | A | * | 10/1971 | Rainey | 156/436 |
| 4,110,683 | A | * | 8/1978 | Cason et al. | 324/522 |
| 4,446,421 | A | * | 5/1984 | Berde | 324/523 |
| 4,477,769 | A | * | 10/1984 | Lowery et al. | 324/517 |
| 4,563,095 | A | * | 1/1986 | Puffer | 356/430 |
| 4,870,591 | A | * | 9/1989 | Cicciarelli et al. | 700/107 |
| 4,939,668 | A | * | 7/1990 | Brown et al. | 706/59 |
| 4,955,216 | A | * | 9/1990 | Barker et al. | 72/13.4 |
| 4,961,533 | A | * | 10/1990 | Teller et al. | 177/25.19 |
| 4,973,238 | A | * | 11/1990 | Kihlken et al. | 425/105 |
| 4,979,389 | A | * | 12/1990 | LaGrotta | 73/37.7 |
| 5,086,397 | A | * | 2/1992 | Schuster et al. | 700/110 |
| 5,101,352 | A | * | 3/1992 | Rembert | 705/7.26 |
| 5,138,698 | A | * | 8/1992 | Aldrich et al. | 345/427 |

(Continued)

*Primary Examiner* — Ryan Jarrett
*Assistant Examiner* — Thomas Stevens
(74) *Attorney, Agent, or Firm* — Merchant & Gould

(57) ABSTRACT

Electronic supervision may be provided. First, a stock number may be sent to a database server. The stock number may correspond to a product comprising, for example, an electrical cable. In response to sending the database server the stock number, specification information corresponding to the product may be received from a database stored on the database server. The specification information may comprise, for an electrical cable, a number of wires, a weight per thousand feet, and a diameter. Next, product production may be monitored to determine faults occurring during production. Monitoring the production may comprise displaying a data monitoring screen to production personnel. The data monitoring screen may provide data regarding the product and product comparison against a standard maintained within the database for the product. Fault data corresponding to the determined faults occurring during the production may be saved to the database.

20 Claims, 8 Drawing Sheets

U.S. PATENT DOCUMENTS

| | | | |
|---|---|---|---|
| 5,155,440 A * | 10/1992 | Huang | 324/539 |
| 5,341,304 A * | 8/1994 | Sakamoto et al. | 700/110 |
| 5,367,624 A * | 11/1994 | Cooper | 715/734 |
| 5,370,237 A * | 12/1994 | Anderson et al. | 209/556 |
| 5,517,234 A * | 5/1996 | Gerber et al. | 348/126 |
| 5,574,817 A * | 11/1996 | Henson et al. | 385/114 |
| 5,841,657 A * | 11/1998 | Hoshino et al. | 700/104 |
| 6,141,867 A * | 11/2000 | Fukada et al. | 29/747 |
| 6,741,081 B1 * | 5/2004 | Eslambolchi et al. | 324/541 |
| 6,795,935 B1 * | 9/2004 | Unkle et al. | 714/37 |
| 6,801,822 B1 * | 10/2004 | Fujiwara et al. | 700/108 |
| 6,825,050 B2 * | 11/2004 | Huang et al. | 438/5 |
| 6,849,565 B1 * | 2/2005 | Gardner et al. | 442/35 |
| 6,898,473 B2 * | 5/2005 | Kabasawa | 700/97 |
| 7,079,911 B2 * | 7/2006 | Gallu et al. | 700/109 |
| 7,113,838 B2 * | 9/2006 | Funk et al. | 700/108 |
| 7,116,993 B2 * | 10/2006 | Farchmin et al. | 455/457 |
| 7,123,974 B1 * | 10/2006 | Hamilton | 700/87 |
| 7,603,586 B1 * | 10/2009 | Skladanowski et al. | 714/31 |
| 7,634,372 B2 * | 12/2009 | Castiglioni et al. | 702/76 |
| 7,653,988 B2 * | 2/2010 | Kamata et al. | 29/825 |
| 2003/0061212 A1 * | 3/2003 | Smith et al. | 707/6 |
| 2003/0065978 A1 * | 4/2003 | Adams | 714/38 |
| 2003/0097197 A1 * | 5/2003 | Parent et al. | 700/108 |
| 2003/0141875 A1 * | 7/2003 | Seymour | 324/525 |
| 2003/0144746 A1 * | 7/2003 | Hsiung et al. | 700/28 |
| 2003/0149547 A1 * | 8/2003 | Nakao et al. | 702/183 |
| 2003/0155415 A1 * | 8/2003 | Markham et al. | 235/376 |
| 2003/0231318 A1 * | 12/2003 | Sartain et al. | 356/635 |
| 2004/0143475 A1 * | 7/2004 | Kilburn et al. | 705/8 |
| 2004/0183545 A1 * | 9/2004 | Eslambolchi et al. | 324/539 |
| 2005/0080502 A1 * | 4/2005 | Chernyak et al. | 700/97 |
| 2005/0131568 A1 * | 6/2005 | Kamata et al. | 700/117 |
| 2005/0197786 A1 * | 9/2005 | Kataria et al. | 702/19 |
| 2005/0251365 A1 * | 11/2005 | Matsushita et al. | 702/185 |
| 2007/0061774 A1 * | 3/2007 | Chan et al. | 717/101 |
| 2008/0140590 A1 * | 6/2008 | Shen | 706/12 |

* cited by examiner

ELECTRONIC SUPERVISOR

RELATED APPLICATION

Under provisions of 35 U.S.C. §119(e), Applicants claim the benefit of U.S. provisional application No. 60/947,893, filed Jul. 3, 2007, which is incorporated herein by reference.

COPYRIGHTS

All rights, including copyrights, in the material included herein are vested in and the property of the Applicants. The Applicants retain and reserves all rights in the material included herein, and grants permission to reproduce the material only in connection with reproduction of the granted patent and for no other purpose.

BACKGROUND

Programmable logic controllers (PLCs) are programmable microprocessor-based devices that are used in discrete manufacturing to control assembly lines and machinery on a shop floor as well as many other types of mechanical, electrical, and electronic equipment in a plant. Using conventional reduced instruction set computer (RISC) based chip sets and programmed in an IEC 61131 programming language, PLCs are designed for realtime use in rugged, industrial environments. Connected to sensors and actuators, PLCs are categorized by a number and type of I/O ports they provide and by their I/O scan rate. PLCs were first used to replace hardwired networks of relays and timers in automobile assembly lines, which were partially automated at that time. The PLCs' programmability enables changes to be effected considerably faster than previous processes.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Electronic supervision may be provided. First, a stock number may be sent to a database server. The stock number may correspond to a product comprising, for example, an electrical cable. In response to sending the database server the stock number, specification information corresponding to the product may be received from a database stored on the database server. The specification information may comprise, for an electrical cable, a number of wires, a weight per thousand feet, and a diameter. Next, product production may be monitored to determine faults occurring during production. Monitoring the production may comprise displaying a data monitoring screen to production personnel. The data monitoring screen may provide data regarding the product and product comparison against a standard maintained within the database for the product. Fault data corresponding to the determined faults occurring during the production may be saved to the database.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
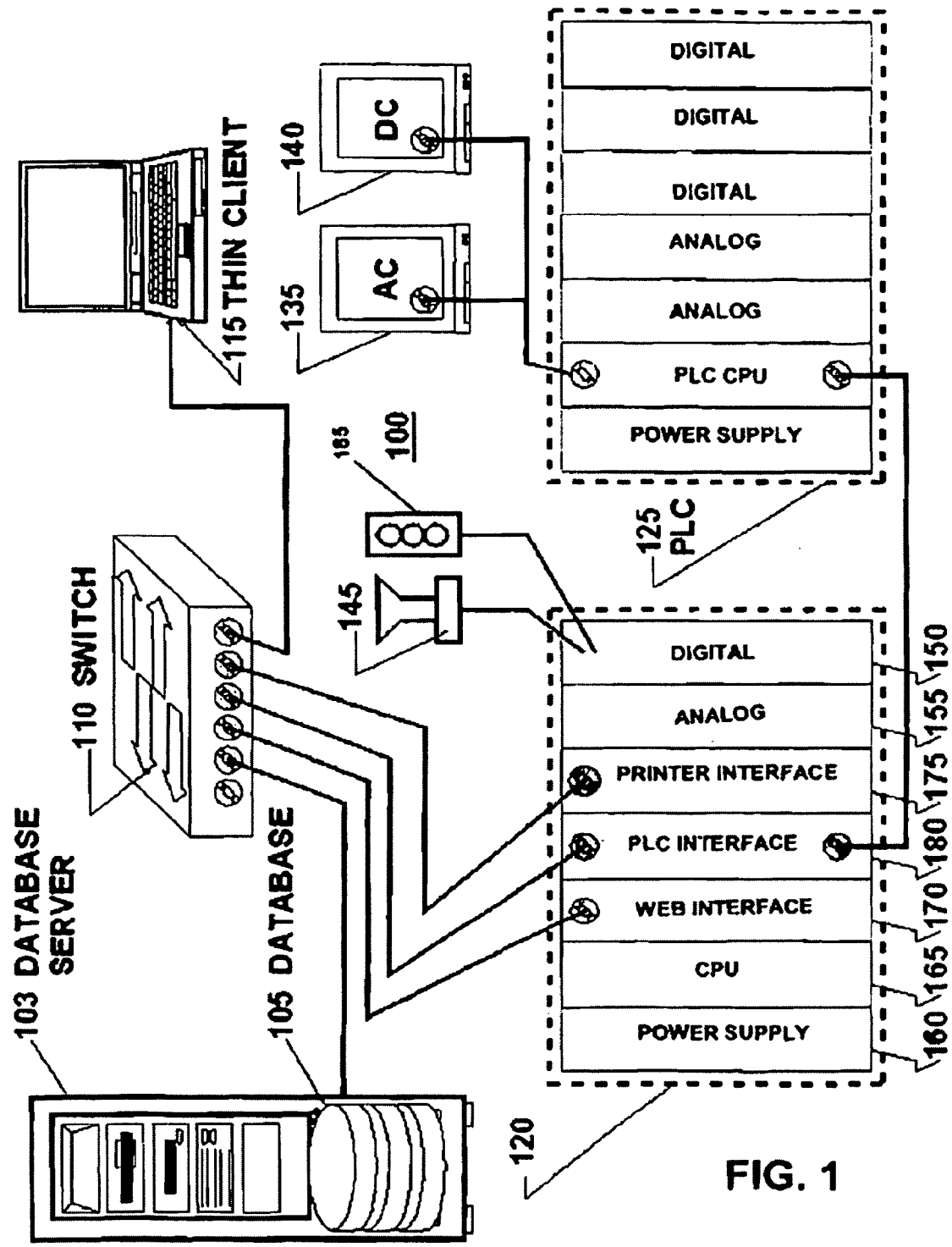
FIG. 1 is a block diagram of a supervisor system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Consistent with embodiments of the invention, an electronic supervisor may be provided to facilitate product production on an assembly line. Embodiments of the invention may integrate information system technology that is generally directed at operating (e.g. production) personnel with machine controllers that provide production equipment automated operation. With conventional systems, personal computers translate and communicate information technology (IT) data to machine controllers. This process is performed by a hierarchy of personal computers on a network due to the design of the databases and the complexity of multiple manufacturing operations within a single facility in conventional systems. Embodiments of the invention may perform all of these tasks without using the aforementioned personal computer hierarchy. In other words, the conventional multiple layer personal computer hierarchy may be reduced to an IT level database and controllers consistent with embodiments of the invention.

Consistent with embodiments of the invention, a product (e.g. electrical wire or cable) may be produced. Specification information defining the product may be sent from an IT database to programmable controllers that may set up, for example, label printing, footage counts, diameter requirements, fault detection, etc. As the product is produced, instrumentation connected directly to programmable controllers may print footage counts directly on the product that may be recorded by the programmable controllers. Subsequent faults in making the product, including, but not limited to average diameter variances, lumps, necks, and electrical insulation failures, may be associated with the footage counts, and presented directly to an assembly line operator (e.g. production personnel) by the programmable controller. This fault data may also be stored in the IT database by the programmable controller. A printing application may compile data from the database, not limited to, but including the information stored by the programmable controllers, and may print this information on a tag. The tag may direct the product to a next step in a manufacturing process based on, for example, fault data on the tag. For example, if the fault data indicates that faults occurring during production were beyond a tolerable level, the tag may indicate that the product be scraped. If the fault data indicates that faults occurring during production were at least acceptable, the tag may indicate that the product be sent to an area from which the product is to be shipped.

Consistent with embodiments of the present invention, the aforementioned activities may be implemented in a system, such as a supervisor system 100 of FIG. 1. Any suitable combination of hardware, software, and/or firmware may be used to implement the memories, processing units, or other components. By way of example, the memory, processing unit or other components may be implemented with a central processing unit (CPU) 165 in combination with system 100. The aforementioned system and processors are examples and other systems and processors may comprise the aforementioned processing units, or other components, consistent with embodiments of the present invention.

By way of a non-limiting example, FIG. 1 illustrates system 100 in which the features and principles of the present invention may be implemented. As illustrated in the block diagram of FIG. 1, system 100 may include a database server 103, a database 105, a switch 110, a thin client 115, a supervisory controller 120, programmable logic controller (PLC) 125, an alternating current (AC) drive 135, a direct current (DC) drive 140, a stack light 185, and alarm horn 145. Supervisory controller 120 may include a digital interface 150, an analog interface 155, a power supply 160, CPU 165, network (e.g. web interface) module 170, a proprietary protocol communications (PLC interface) module 180, and a serial communications interface (printer interface) module 175. AC drive 135 and DC drive 140 may be used to control a manufacturing line configured to manufacture the product comprising, for example, an electrical cable.

Database server 103 may serve data from database 105. Database 105 may contain all the pertinent information (e.g. a specification) on how to make a particular product, for example, an electrical wire or cable. A stock number may correspond to the specification. The specification may define, for example, the number of wires in the cable, the weight per thousand feet of the cable, the cable diameter, etc. Supervisory controller 120 may also send data back to database server 103 to be stored, for example, fault data. Switch 110 may comprise, for example, an Ethernet switch. Thin client 115 may comprise a computer terminal capable on running, for example, a browser. Thin client 115 may perform no data processing, but may function like an input/output terminal, processing only keyboard and mouse input and screen output. Power supply 160 may supply power to supervisory controller 120.

Web interface module 170 may provide a web interface for supervisory controller 120. For example, web interface module 170 may allow a user using the internet to review how well supervisory controller 120 if functioning and determine if supervisory controller 120 is experiencing any trouble. Printer interface module 175 may connect supervisory controller 120 to a printer (not shown.) The printer may print, for example, sequential footage markings on cable being produced on an assembly line (e.g. manufacturing line.) Printer interface module 175 may provide a web interface for the printer. Supervisory controller 120 may include digital interface 150 and analog interface 155 to control horn 145 or stack light 185, for example. Horn 145 or stack light may be "set off" when a problem (e.g. a spark test, diameter, neck, lump fault, etc.) occurs. PLC 125 may control AC drive 135 and DC drive 140 and other digital and analog devices during product manufacture on the assembly line.

Web interface module 170 and thin client 115 may use Java Virtual Machines (JVM's). Within the JVM, application software runs that accesses Java Archive (JAR) files that may provide database access to database server 103. The JAR files may provide a repository for part of electronic supervisor code, graphical objects for display of the operation of the electronic supervisor over the web, and logical objects for the processing of the data prior to display or database insertion. Additionally, a web server, a telnet server, and an FTP server may be used for loading and maintaining web interface module 170.

Furthermore, a program may run in CPU 165 that periodically obtains the time from database server 103 via web interface module 170 so that clock coordination may be maintained between database server 103 and supervisory controller 120. The program may also obtain data from PLC 125 through PLC interface module 180. PLC interface module 180 may provide address mappings from PLC 125 to supervisory controller 120. This may make supervisory controller 120 portable in that moving from one control processor to another only requires minimal configuration changes to address mappings. Printer interface module 175 may provide direct access to the printer on the assembly line. Software within printer interface module 175 may require no configuration changes between implementations.

The program running on CPU 165 may need only minimal configuration changes between production line implementations. These configuration changes may include changing the machine name and IP address, and physical distance locations between the printer and the various pieces of test equipment on the production line (e.g. spark tester, diameter gage, lump and neck detectors, etc.). In this manner, footage markings placed on the cable may correspond to any fault determined by the aforementioned test equipment.

Consistent with embodiments of the invention, tables in database 105 may be populated with human readable, and automatically shadowed by machine-readable data columns. This automated translation within the design of database 105 may remove, for example, a requirement for a translation program interposed between the programmable controller on the assembly line, a visualization program at an operator station, and database server 103. Moreover, embodiments of the invention may provide management and reporting screens (not shown) and a tag printing application (not shown). CPU 165 and thin client 115 may compile results from database 105 and present them, for example, to operating personnel. In this way, the product may be directed downstream in the manufacturing sequence to a proper location for further processing.

Figure 2:
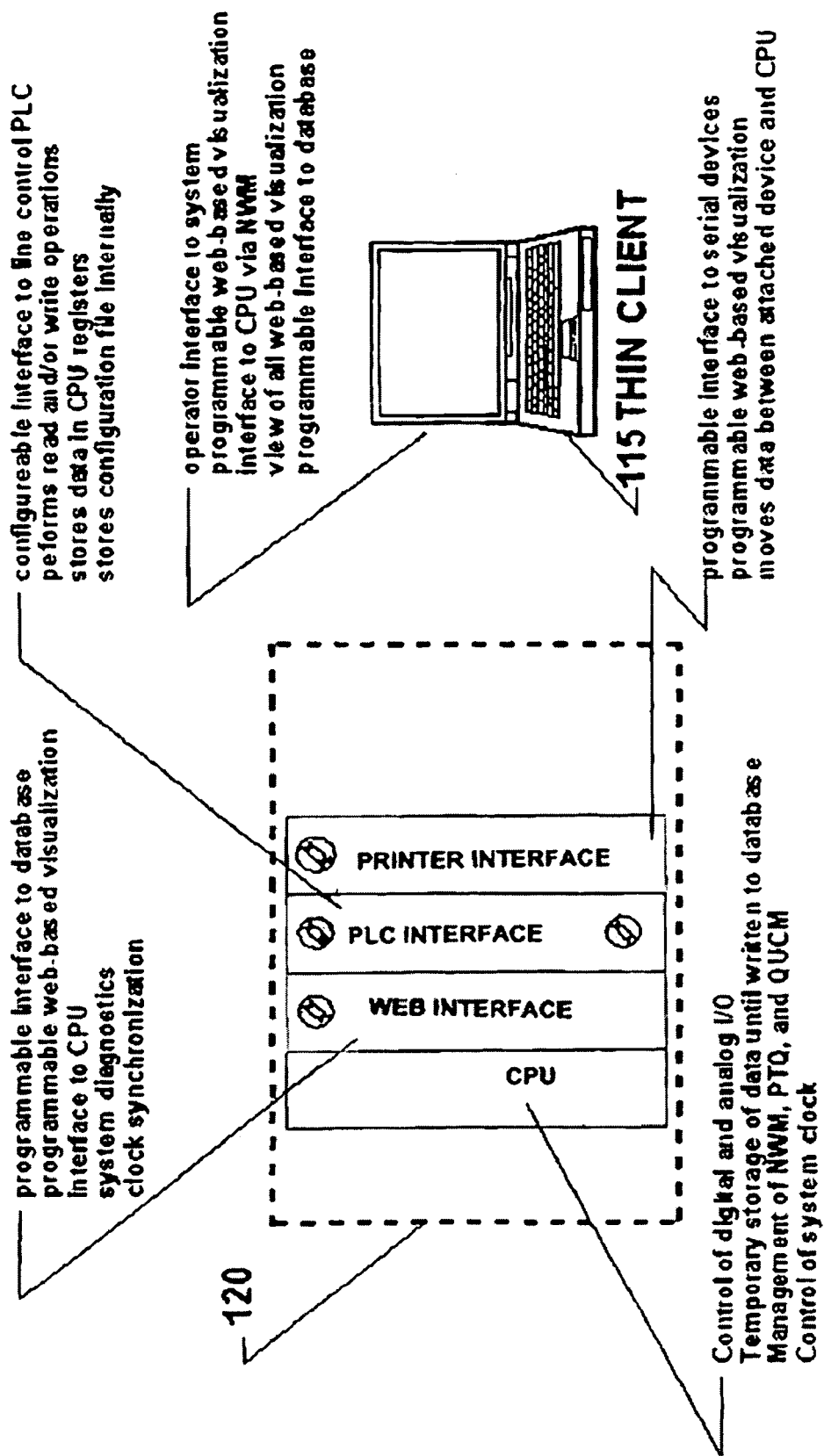
FIG. 2 is a block diagram of the supervisor system processes.

FIG. 2. shows the components of supervisory controller 120 and item 115 in functional detail. Supervisory controller 120 may contain a CPU which may contain program and data memory. The CPU program may control and collect cable fault data from a digital interface and an analog interface (shown in FIG. 1.) The CPU program may store the fault data that it collects in the data memory that it contains. The CPU program may manage and collect process data from line control PLC (shown in FIG. 1) from PLC interface module 180 contained in supervisory controller 120, and may store this data in the aforementioned data memory. The CPU program may manage and collect data for clock synchronization and from the database server (shown in FIG. 1) from web interface module 170 contained in supervisory controller 120, and store this data in the aforementioned data memory. The CPU program may compare data in data memory collected from web interface module 170 and PLC interface module 180, and control the stack light and alarm horn in FIG. 1 base on this comparison.

The CPU program may collect data from printer interface module 175 contained in supervisory controller 120. It then may use this data to determine the position of faults on the cable indicated by the aforementioned analog and digital interface (shown in FIG. 1). The CPU program then may send the data that it has stored in data memory with the position information to web interface module 170, which may move this information to the database server (shown in FIG. 1).

The elements shown in FIG. 1 may communicate over a network. The network may comprise, for example, a local area network (LAN) or a wide area network (WAN). Such networking environments are commonplace in offices, enterprise-wide computer networks, intranets, and the Internet. When a LAN is used as the network, a network interface located at any of the processors may be used to interconnect any of the processors. When the network is implemented in a WAN networking environment, such as the Internet, the processors may typically include an internal or external modem (not shown) or other means for establishing communications over the WAN. Further, in utilizing the network, data sent over the network may be encrypted to insure data security by using known encryption/decryption techniques.

In addition to utilizing a wire line communications system as the network, a wireless communications system, or a combination of wire line and wireless may be utilized as the network in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission. For example, the processors may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802), a bluetooth interface, another RF communication interface, and/or an optical interface.

Database server 103 ("the processor") included in system 100 may be implemented using a personal computer, network computer, mainframe, or other similar microcomputer-based workstation. The processor may though comprise any type of computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

System 100 may also transmit data by methods and processes other than, or in combination with, the network. These methods and processes may include, but are not limited to, transferring data via, diskette, flash memory sticks, CD ROM, facsimile, conventional mail, an interactive voice response system (IVR), or via voice over a publicly switched telephone network.

Figure 3:
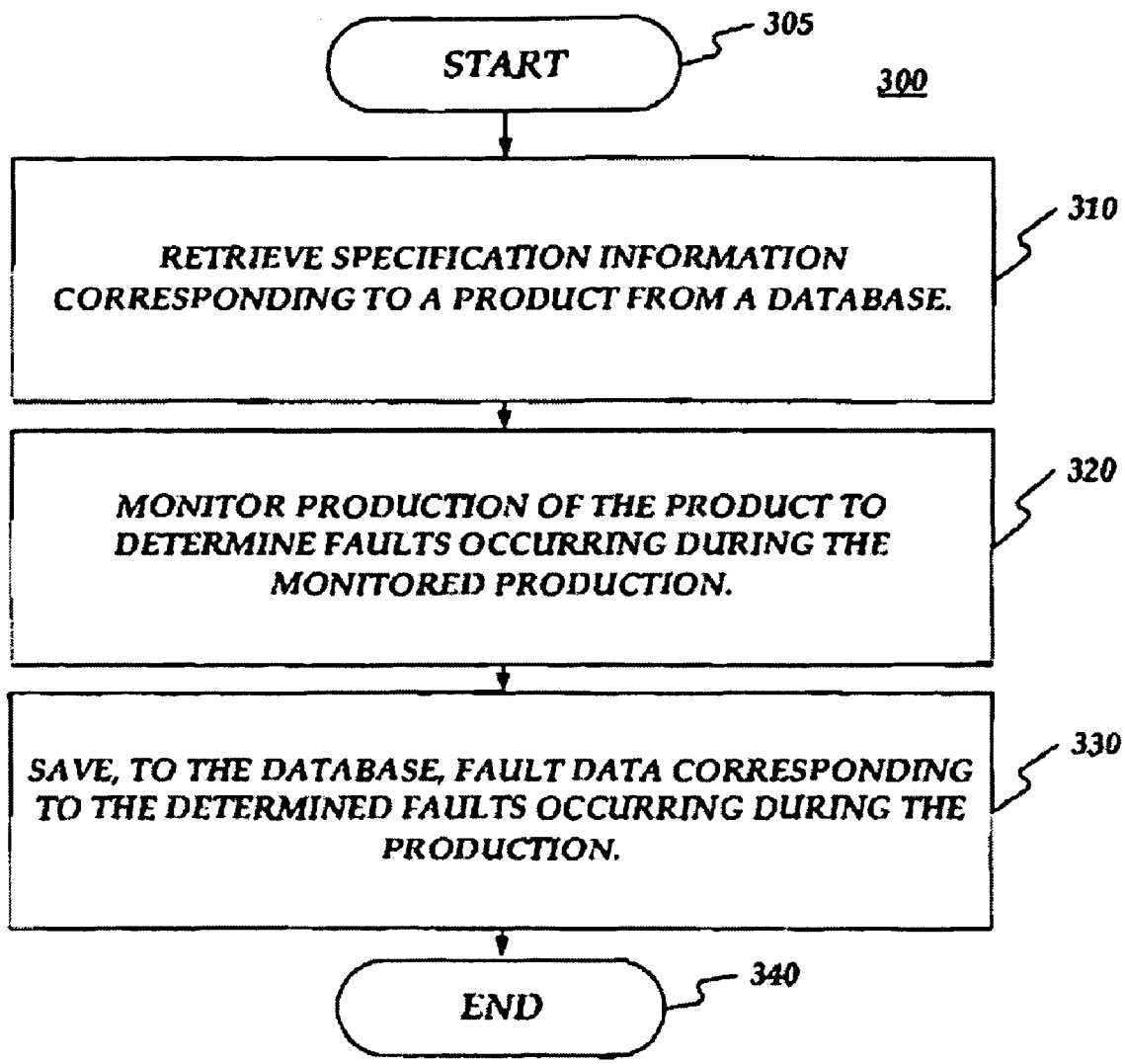
FIG. 3 is a flow chart of a method for providing electronic supervision.

FIG. 3 is a flow chart setting forth the general stages involved in a method 300 consistent with an embodiment of the invention for providing an electronic supervisor. Method 300 may be implemented using CPU 165 as described in more detail above with respect to FIG. 1. Ways to implement the stages of method 300 will be described in greater detail below. FIG. 5A, FIG. 5B, FIG. 5C, and FIG. 5D show variations of method 300 as described below.

Method 300 may begin at starting block 305 and proceed to stage 310 where CPU 165 may retrieve specification information corresponding to a product from database 105. For example, CPU 165 may send a signal to web interface module 170 to retrieve specification information from database 105, based on a machine number of PLC 125. CPU 165 may also retrieve processing information such as a recommended line speed for the manufacturing line ran by PLC 125. A print legend for the cable being manufactured by the manufacturing line may be retrieved from database 105 as well.

Figure 4:
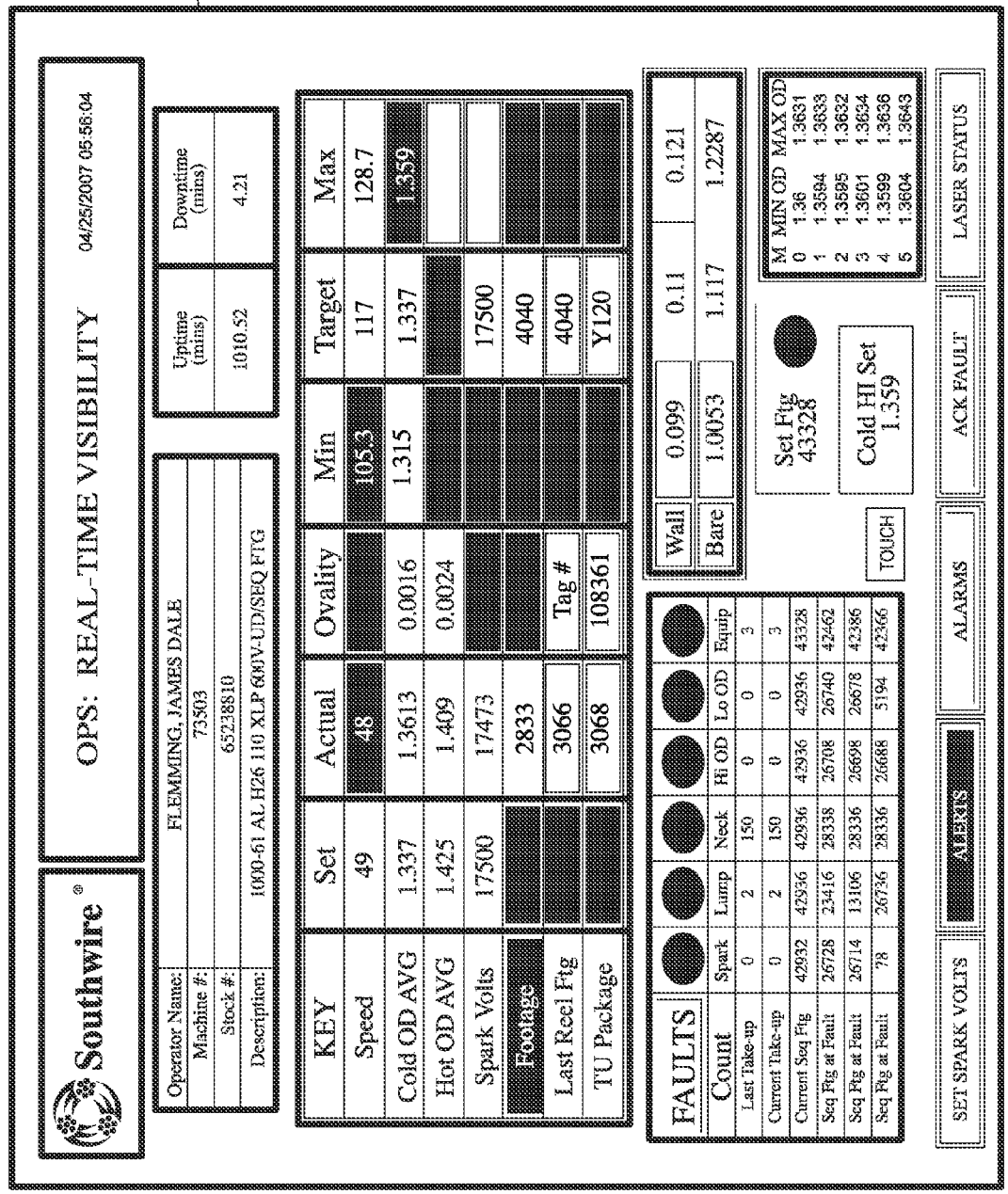
FIG. 4 shows a data monitoring screen.
Figure 5A:
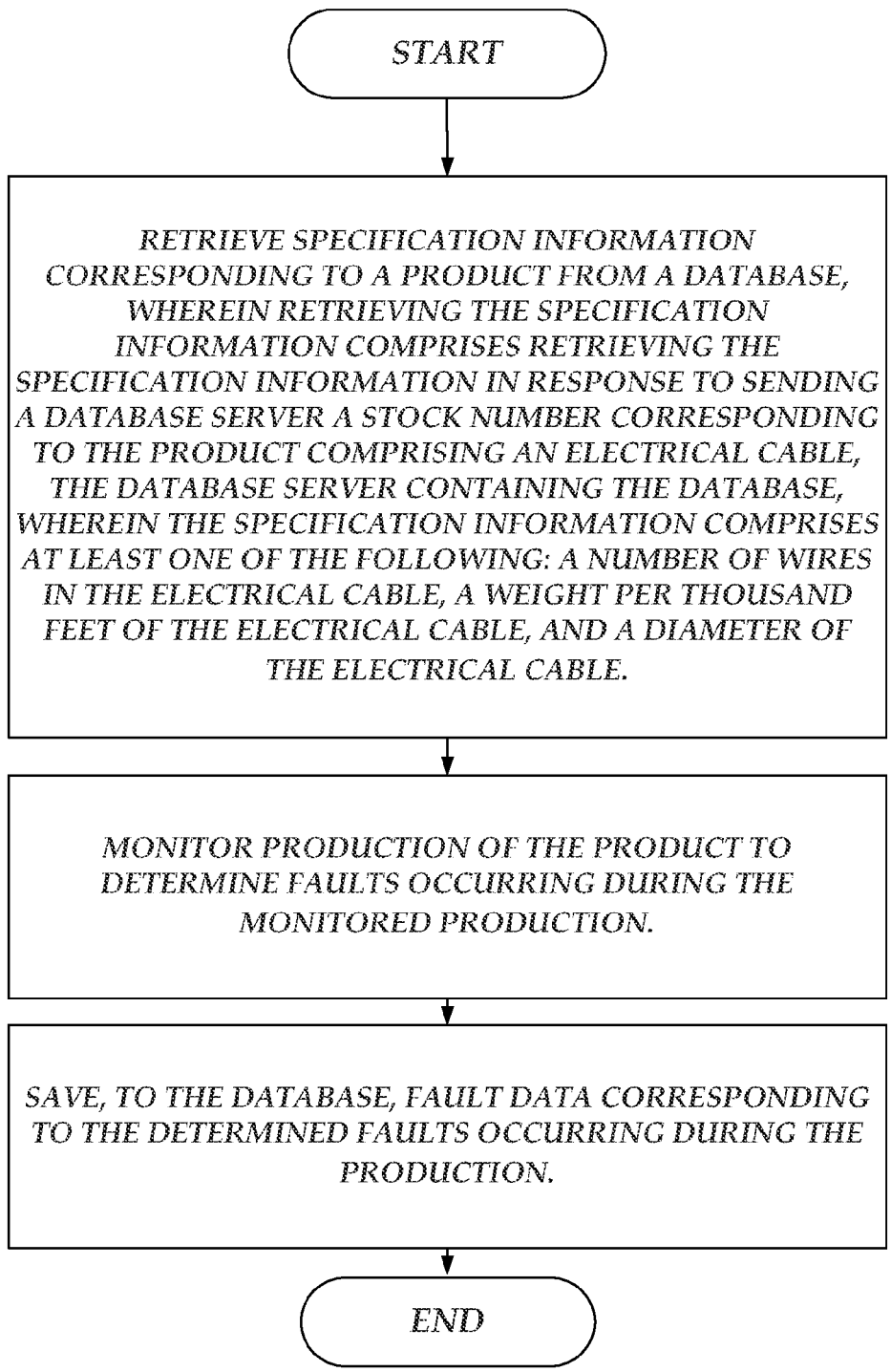
FIG. 5A, FIG. 5B, FIG. 5C, and FIG. 5D are flow charts of a method for providing electronic supervision.
Figure 5B:
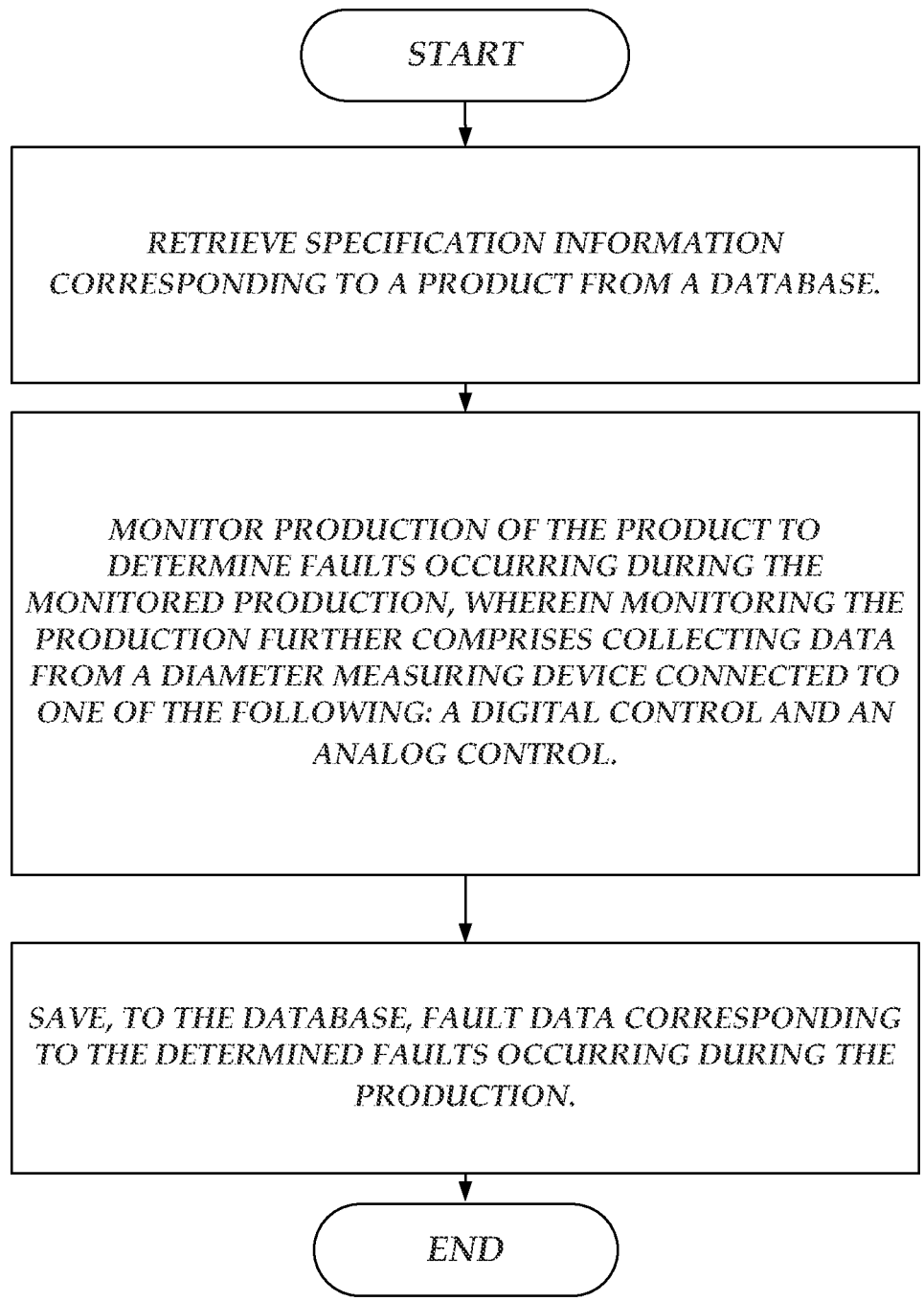
Figure 5C:
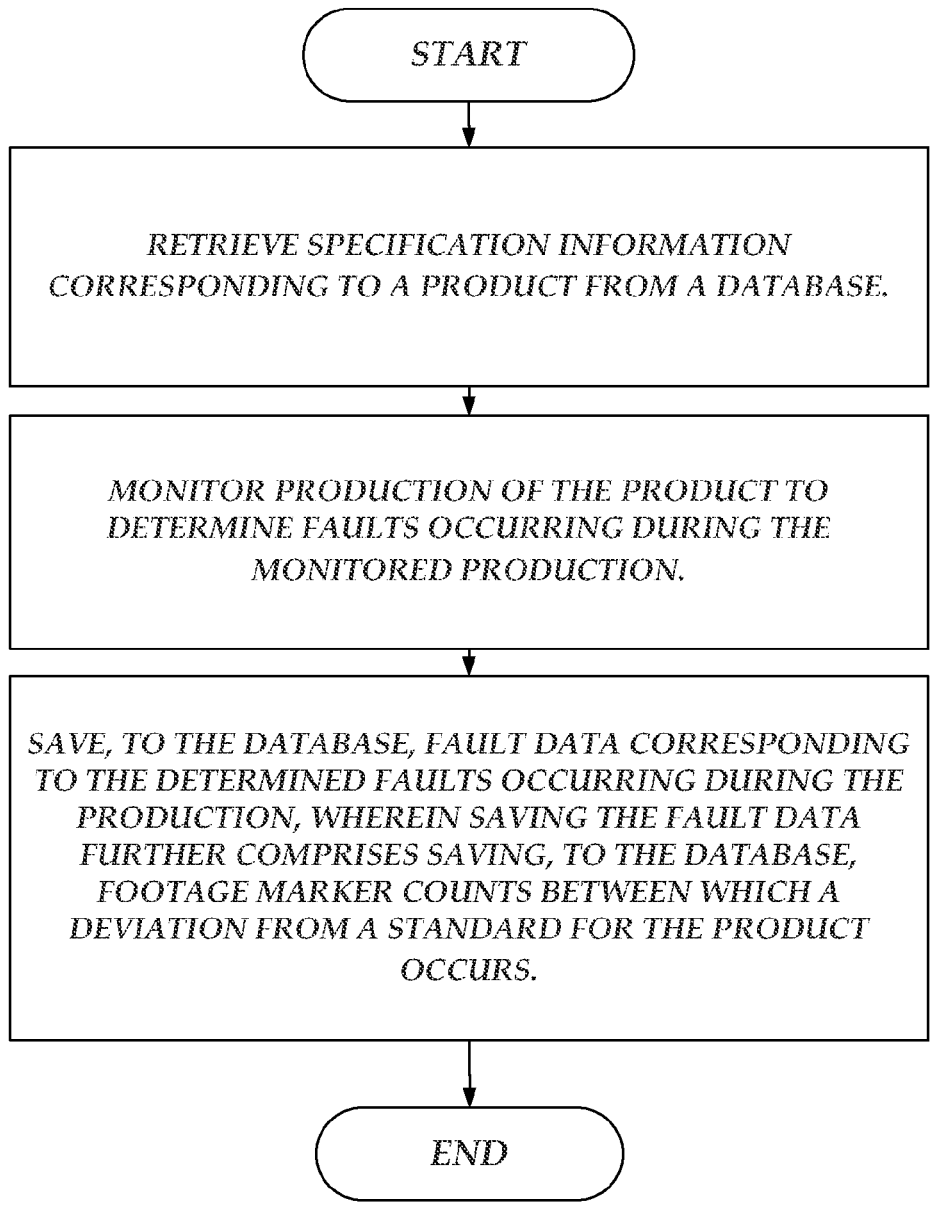
Figure 5D:
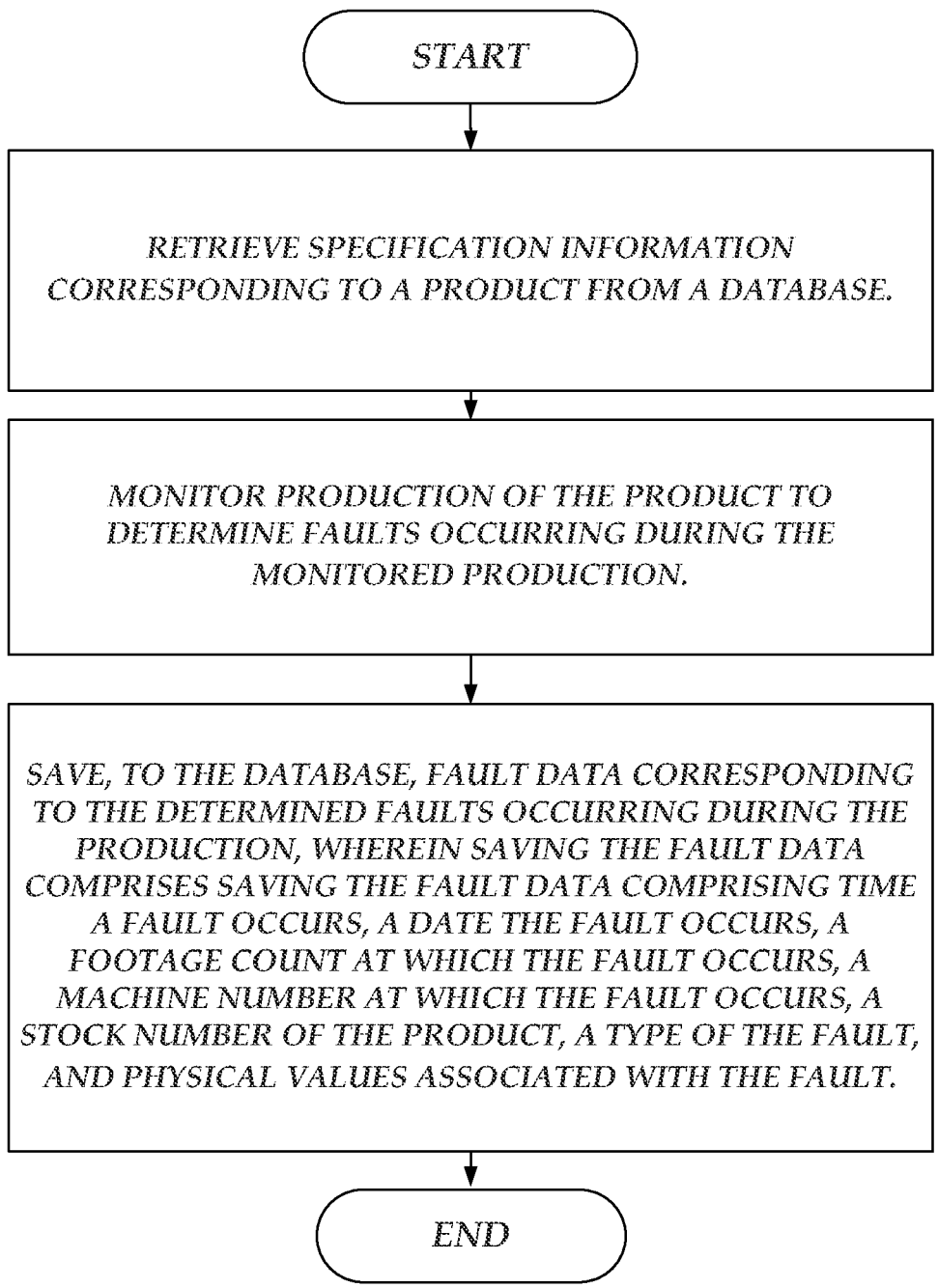

From stage 310, where CPU 165 retrieves the specification information corresponding to the product from database 105, method 300 may advance to stage 320 where CPU 165 may monitor production of the product to determine faults occurring during the monitored production. For example, CPU 165 may monitor product production and detect any faults occurring during the production. For example, CPU 165 may collect data from a diameter measuring device connected to, for example, digital control 150 or analog control 155. FIG. 4 shows a data monitoring screen 405 that may be displayed to production personnel on thin client 115. Screen 405 may show output from measuring devices such as the aforementioned diameter measuring device. CPU 165 may then provide averaging and a comparison against a standard maintained within database 105 for the product. If the measured diameter deviates from the standard, the printed footage counts between which the deviations exist may be recorded. Moreover, CPU 165 may also record the printed footage counts between which lie mechanical and/or surface flaws in the cable. This may be prompted by, but not limited to discrete signals from a lump and neck flaw detector on the assembly line connected, for example, to digital control 150 or analog control 155. Furthermore, CPU 165 may record the printed footage counts between which lie electrical insulation flaws in the cable. This may be prompted by, but not limited to discrete signals from a spark test apparatus on the manufacturing line connected, for example, to digital control 150 or analog control 155.

Once CPU 165 monitors production of the product in stage 320, method 300 may continue to stage 330 where CPU 165 may save the fault data corresponding to the determined faults occurring during the production. For example, CPU 165 may save fault data corresponding to any determined faults occurring during the production. CPU 165 may provide signals to web interface module 170 to execute data write operations to database 105 to provide, for example, time and date of flaws, footage counts, machine number, stock number, fault counter, type of flaw, database insertion time, physical values associated with a fault, etc. A current information table may be maintained within CPU 165 for local display on thin client 115. In addition, CPU 165 may use a Java program located within a JAR file. This program may use provided display and logic beans to provide operator visualization of data at thin client 115, horn 145, or stack light 185 for example. After CPU 165 saves the fault data in stage 330, method 300 may then end at stage 340.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While certain embodiments of the invention have been described, other embodiments may exist. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

The invention claimed is:

1. A method for providing electronic supervision, the method comprising:
   retrieving specification information corresponding to a product comprising an electrical cable from a database, wherein retrieving the specification information comprises retrieving at least one of the following: a number of wires in the electrical cable, a weight per thousand feet of the electrical cable, and a diameter of the electrical cable, in response to sending, through a web interface module, a database server a stock number corresponding to the product, the database server containing the database;
   monitoring production of the product to determine faults occurring during the monitored production; and
   saving, to the database, fault data corresponding to the determined faults occurring during the production.

2. The method of claim 1, wherein monitoring the production further comprises collecting data from a diameter measuring device connected to one of the following: a digital control and an analog control.

3. The method of claim 1, wherein monitoring the production further comprises displaying a data monitoring screen to production personnel on a thin client.

4. The method of claim 1, wherein monitoring the production further comprises displaying a data monitoring screen to production personnel on a thin client, the data monitoring screen providing data regarding the product and a comparison of the product against a standard maintained within the database for the product.

5. The method of claim 1, wherein saving the fault data further comprises saving, to the database, footage marker counts between which a deviation from a standard for the product occurs.

6. The method of claim 1, wherein saving the fault data further comprises saving, to the database, footage marker counts between which a deviation from a standard for the product occurs, the deviation comprising at least one of the following: a mechanical surface flaw, a surface flaw, a lump flaw, and a neck flaw.

7. The method of claim 1, wherein saving the fault data further comprises saving, to the database, footage marker counts between which a deviation from a standard for the product occur, the deviation comprising an insulation flaw.

8. The method of claim 1, wherein saving the fault data further comprises saving, to the database, footage marker counts between which a deviation from a standard for the product occur, the deviation comprising an insulation flaw, the insulation flaw being detected using a spark test apparatus on a manufacturing line used to make the product, the spark test apparatus being connected to one of the following: a digital control and an analog control.

9. The method of claim 1, wherein saving the fault data comprises saving the fault data comprising time a fault occurs, a date the fault occurs, a footage count at which the fault occurs, a machine number at which the fault occurs, the stock number of the product, a type of the fault, and physical values associated with the fault.

10. The method of claim 1, further comprising:
obtaining a time value from the database server containing the database; and
updating a supervisory controller with the obtained time value via a web interface module, the supervisory controller being configured to control the manufacturing of the product.

11. A non-transitory computer-readable medium which stores a set of instructions which when executed performs a method for providing electronic supervision, the method executed by the set of instructions comprising:
sending a database server a stock number corresponding to a product, the product comprising an electrical cable;
in response to sending the database server the stock number, retrieving specification information corresponding to the product from a database stored on the database server, the specification information comprising at least one of the following: a number of wires in the electrical cable, a weight per thousand feet of the electrical cable, and a diameter of the electrical cable;
monitoring production of the product to determine faults occurring during the monitored production, wherein monitoring the production further comprises displaying a data monitoring screen to production personnel on a thin client, the data monitoring screen providing data regarding the product and a comparison of the product against a standard maintained within the database for the product; and
saving, to the database, fault data corresponding to the determined faults occurring during the production.

12. The non-transitory computer-readable medium of claim 11, wherein saving the fault data comprises saving the fault data comprising at least one of the following: a time a fault occurs, a date the fault occurs, a footage count at which the fault occurs, a machine number at which the fault occurs, a stock number of the product, a type of the fault, and physical values associated with the fault.

13. The non-transitory computer-readable medium of claim 11, further comprising:
obtaining a time value from a database server containing the database; and
updating a supervisory controller with the obtained time value via a web interface module.

14. A system for providing electronic supervision, the system comprising:
a memory storage; and
a processing unit coupled to the memory storage, wherein the processing unit is operative to:
retrieve specification information corresponding to a product from a database, the processing unit being operative to retrieve the specification information comprises the processing unit being operative to retrieve the specification information in response the processing unit sending a database server a machine number of a programmable logic controller, the database server containing the database, the programmable logic controller being configured to control a manufacturing line configured to manufacture the product, wherein the specification information comprises a recommended line speed for the manufacturing line;
monitor production of the product to determine faults occurring during the monitored production, wherein the processing unit being operative to monitor the production further comprises the processing unit being operative to display a data monitoring screen to production personnel on a thin client;
save, to the database, fault data corresponding to the determined faults occurring during the production, wherein the processing unit being operative to save the fault data comprises the processing unit being operative to save the fault data comprising a time a fault occurs, a date the fault occurs, a footage count at which the fault occurs, a machine number at which the fault occurs, a stock number of the product, a type of the fault, and physical values associated with the fault;
obtain a time value from a database server containing the database; and
update a supervisory controller with the obtained time value via a web interface module.

15. A method for providing electronic supervision, the method comprising:
retrieving specification information corresponding to a product from a database, wherein retrieving the specification information comprises retrieving the specification information in response to sending a database server a stock number corresponding to the product comprising an electrical cable, the database server containing the database, wherein the specification information comprises at least one of the following: a number of wires in the electrical cable, a weight per thousand feet of the electrical cable, and a diameter of the electrical cable;
monitoring production of the product to determine faults occurring during the monitored production; and
saving, to the database, fault data corresponding to the determined faults occurring during the production.

16. A method for providing electronic supervision, the method comprising:
retrieving specification information corresponding to a product from a database, the product comprising an electrical cable, wherein retrieving the specification information comprises retrieving at least one of the following: a number of wires in the electrical cable, a weight per thousand feet of the electrical cable, and a diameter of the electrical cable;

monitoring production of the product to determine faults occurring during the monitored production, wherein monitoring the production further comprises collecting data from a diameter measuring device connected to one of the following: a digital control and an analog control; and saving, to the database, fault data corresponding to the determined faults occurring during the production.

17. A method for providing electronic supervision, the method comprising:
retrieving specification information corresponding to a product from a database;
monitoring production of the product to determine faults occurring during the monitored production; and
saving, to the database, fault data corresponding to the determined faults occurring during the production, wherein saving the fault data further comprises saving, to the database, footage marker counts between which a deviation from a standard for the product occurs, the deviation comprising an insulation flaw.

18. The method of claim 17, wherein the deviation further comprises at least one of the following: a mechanical surface flaw, a surface flaw, a lump flaw, and a neck flaw.

19. The method of claim 17, wherein the insulation flaw is detected using a spark test apparatus on a manufacturing line used to make the product, the spark test apparatus being connected to one of the following: a digital control and an analog control.

20. A method for providing electronic supervision, the method comprising:
retrieving specification information corresponding to a product from a database;
monitoring production of the product to determine faults occurring during the monitored production; and
saving, to the database, fault data corresponding to the determined faults occurring during the production, wherein saving the fault data comprises saving the fault data comprising time a fault occurs, a date the fault occurs, a footage count at which the fault occurs, a machine number at which the fault occurs, a stock number of the product, a type of the fault, and physical values associated with the fault.

* * * * *